US008773300B2

(12) United States Patent
Stratis et al.

(10) Patent No.: US 8,773,300 B2

(45) Date of Patent: Jul. 8, 2014

(54) ANTENNA/OPTICS SYSTEM AND METHOD

(75) Inventors: Glafkos K. Stratis, Lake Worth, FL (US); Alphonso A. Samuel, Tucson, AZ (US); Salvatore Bellofiore, Vail, AZ (US); David J. Knapp, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 579 days.

(21) Appl. No.: 13/076,836

(22) Filed: Mar. 31, 2011

(65) Prior Publication Data

US 2012/0249357 A1 Oct. 4, 2012

(51) Int. Cl.
*G01S 7/41* (2006.01)

(52) U.S. Cl.
USPC .............................................. 342/54; 342/62

(58) Field of Classification Search
USPC .............................................. 342/54, 62, 175
See application file for complete search history.

(56) References Cited

U.S. PATENT DOCUMENTS

| | | | | | |
|---|---|---|---|---|---|
| 3,115,271 | A | * | 12/1963 | Anderson et al. | 343/872 |
| 3,396,396 | A | * | 8/1968 | Charlton et al. | 343/708 |
| 3,576,581 | A | * | 4/1971 | Tricoles et al. | 343/872 |
| 3,979,755 | A | * | 9/1976 | Sandoz et al. | 343/754 |
| 4,189,731 | A | * | 2/1980 | Rope et al. | 343/872 |
| 4,386,356 | A | * | 5/1983 | Tricoles et al. | 342/445 |
| 4,570,166 | A | * | 2/1986 | Kuhn et al. | 343/872 |
| 4,949,920 | A | * | 8/1990 | Schindel et al. | 244/117 A |
| 4,989,007 | A | * | 1/1991 | Coffey et al. | 342/11 |
| 5,191,351 | A | * | 3/1993 | Hofer et al. | 343/895 |
| 5,384,458 | A | * | 1/1995 | Hilliard et al. | 250/227.17 |
| 5,686,929 | A | * | 11/1997 | Thiere et al. | 343/792.5 |
| 5,724,052 | A | * | 3/1998 | Boulingre et al. | 343/872 |
| 5,835,062 | A | * | 11/1998 | Heckaman et al. | 343/700 MS |
| 5,973,649 | A | | 10/1999 | Andressen | |
| 6,060,703 | A | * | 5/2000 | Andressen | 250/203.6 |
| 6,107,976 | A | * | 8/2000 | Purinton | 343/872 |
| 6,150,974 | A | * | 11/2000 | Tasaka et al. | 342/53 |
| 6,219,005 | B1 | | 4/2001 | Szafranek | |
| 6,342,860 | B1 | * | 1/2002 | Haussler et al. | 343/702 |
| 6,531,989 | B1 | * | 3/2003 | Barker et al. | 343/753 |
| 6,952,179 | B1 | * | 10/2005 | Jones | 342/62 |
| 7,595,765 | B1 | * | 9/2009 | Hirsch et al. | 343/789 |
| 8,264,405 | B2 | * | 9/2012 | Pozgay | 342/363 |
| 2009/0213019 | A1 | * | 8/2009 | Schoebel | 343/711 |

(Continued)

FOREIGN PATENT DOCUMENTS

| | | | | | |
|---|---|---|---|---|---|
| JP | 58177004 | A | * | 10/1983 | H01Q 1/42 |
| JP | 06313699 | A | * | 11/1994 | F42B 10/46 |

*Primary Examiner* — John B Sotomayor
(74) *Attorney, Agent, or Firm* — Renner, Otto, Boisselle & Sklar, LLP

(57) ABSTRACT

A missile includes a radar system that has a radome through which a main antenna sends and receives signals. The radome includes a radome body and a radome tip include different transmissive materials, with for example the radome body primarily made of a lossy optically nontransparent material, and the radome tip primarily made of a lossless (permittivity with low imaginary part) glass material that may also be optically transparent. A laser may be used in conjunction with the radome to send and receive encoded signals. The laser may be located behind (aft of) the main antenna, and one or more optical fibers may extend into and/or along the radome to guide laser signals to the radome tip. The laser may be used to emit encoded signals so as to allow multiple radar systems operating in the same area at the same time to discriminate between different targets.

25 Claims, 3 Drawing Sheets

(56) References Cited

U.S. PATENT DOCUMENTS

2010/0058946 A1* 3/2010 Geswender et al. .......... 102/206
2012/0212391 A1* 8/2012 Dazet ............................ 343/872
2012/0249357 A1* 10/2012 Stratis et al. .................... 342/54
2012/0249358 A1* 10/2012 Stratis et al. .................... 342/62

* cited by examiner

ANTENNA/OPTICS SYSTEM AND METHOD

BACKGROUND OF THE INVENTION

1. Field of the Invention

The present invention relates to radar systems and methods, such as missile radar systems and methods.

2. Description of the Related Art

Radomes are structures designed to cover antennas and thereby to protect them from direct exposure to aerodynamic and environmental conditions, while being as transparent as possible to the antenna's electromagnetic (EM) radiation. However many types of radomes include various forms of discontinuities or blockages. These discontinuities are not necessarily due to material changes, but in many cases due to shape changes. For example, radomes on high-speed, airborne platforms are usually equipped with a metallic tip to protect the radome against rain, erosion, etc. However there is room for improvement in this field of endeavor.

SUMMARY OF THE INVENTION

The metallic tip is at the very end of a dielectric/lossy edge which is an extension of the radome body, which is also lossy since it is the same material as the radome body. Surfaces inside the radome (cylindrical portion) that are at a certain distance from the main wedge have some blockage of the outgoing RF energy, but the blockage is not significant. Going further forward on the radome, in the region where the wedge begins to form, that part of the wedge acts almost as a metallic entity, especially at higher frequencies. This is because of the lossy material, combined with the wedge (i.e., the shape change), causes a significant blockage of the RF energy transmitted by the main antenna. That RF energy blockage causes a hole in the radiation pattern for the antenna, which is a bad thing since certain areas that are supposed to be covered by the RF energy, are in reality not covered. This lossy wedge, compared to the rest of the radome body which is cylindrical, causes a significant RF blockage, for the incoming or out coming RF energy. This lossy wedge has been found to lead to EM discontinuities for the main antenna located in the back of the radome. An approach to ameliorating these discontinuities, described in detail below, is to add a lossless wedge just before the metallic tip and go backwards between the radome tip and the antenna. This lossless wedge could be transparent glass or non transparent glass. The use of a lossless transparent material also provides the opportunity to introduce optics capabilities in addition to the removal of the radiation pattern hole.

According to an aspect of an invention, a missile includes different radiatively-transmissive materials in its radome body and its radome tip.

According to a still further aspect of the invention, a radome has an optically-transmissive tip.

According to another aspect of the invention, a radome has a tip that is substantially optically transparent.

According to yet another aspect of the invention, a missile emits encoded laser signals through its radome.

According to still another aspect of the invention, a missile radar system includes: a main antenna; and a radome enclosing the main antenna. The radome includes a radome body and a radome wedge. The radome body has a wide end and a narrow end, with the main antenna at the wide end, and the radome wedge at the narrow end. The radome wedge and the radome body include different materials that are substantially transparent to radar signals emitted by the main antenna.

According to a further aspect of the invention, a method of missile target guidance includes the steps of: receiving a reflected signal from an intended target of a missile, wherein the reflected signal is received at a seeker of a missile, after passing through an optically-transparent radome wedge of the missile; examining the reflected signal for the presence of signals not including encoding associated with the missile; and if the reflected signal includes signals including encoding not associated with the missile, rejecting and not using for navigation purposes the signals including encoding not associated with the missile.

According to a still further aspect of the invention, a method of improving performance of an antenna includes the steps of: providing a radome with a lossless, optically transparent radome wedge and a lossy dielectric radome body; and placing the antenna within the radome.

According to another aspect of the invention, a missile optical system includes: a radome having an optically transmissive front radome wedge; a seeker that within the radome that sends and receives optical signals on an optical path that passes through the optically transmissive front radome wedge; and one or more lenses in the optical path, between the seeker and the optically transmissive front radome wedge.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

A missile includes a radar system that has a radome through which a main antenna sends and receives signals. The radome includes a radome body at a relatively wide area of the radome, and a radome tip at a relatively narrow end of the radome, with the tip including the apex (edge) of the radome (the forward-most part of the radome). The radome body and the radome tip include different transmissive materials, with for example the radome body primarily made of a lossy optically nontransparent material, and the radome tip primarily made of a lossless (permittivity with low imaginary part) glass material that may also be optically transparent. A laser may be used in conjunction with the radome to send and receive encoded signals. The laser may be located behind (aft of) the main antenna, and one or more optical fibers may extend into and/or along the radome to guide laser signals to the radome tip. The laser may be used to emit encoded signals so as to allow multiple radar systems operating in the same area at the same time to discriminate between different targets.

Figure 1:
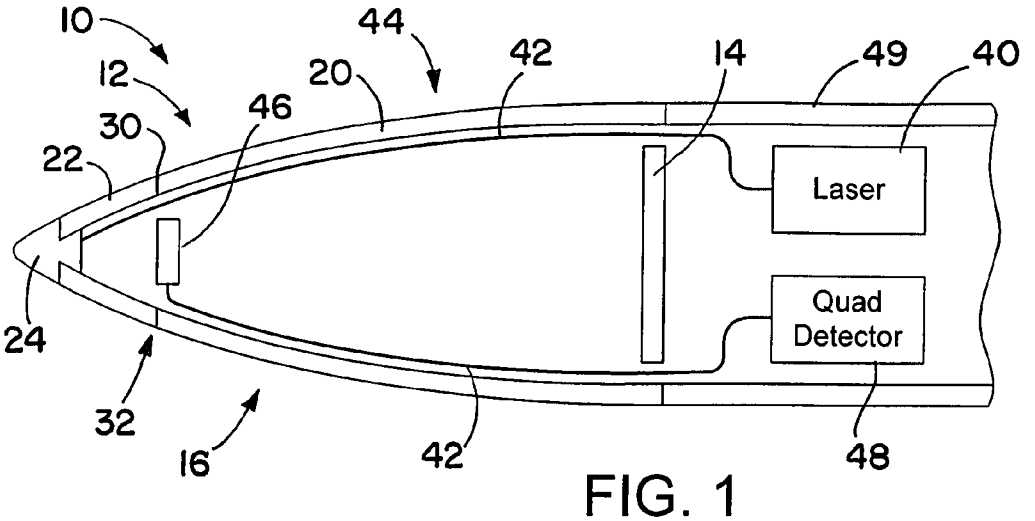
FIG. 1 is a cross-sectional view of a missile including a missile radar system in accordance with an embodiment of the present invention.

FIG. 1 shows a portion of a missile 10 that has a radar system 12 that includes a main antenna 14 that is enclosed by a radome 16. The radome 16 has a radome body 20 and a radome wedge (edge) 22. The radome body 20 is at the aft end of the radome 16, where the radar main antenna 14 is located. The radome body 20 may be made of a conventional radome material, such as a ceramic, that to is substantially radiatively transmissive or transparent, so as to allow radar signals to pass into and out of the radome 16. The radome body 20 has a tapered shape, being wider at its aft end, and narrower at its front end, where it connects to the radome wedge (edge) 22. The radome body 20 may have any of a variety of suitable shapes, for example having a conical shape or an ogive-like shape.

The radome wedge (edge) 22 is also at least partially transparent to radiation emitted by and/or received by the antenna 14. Thus the radome wedge (edge) 22 may also be described as radiatively transmissive or optically transparent. However the radome wedge (edge) 22 includes a different material than the radome body 20. This may be an optically transparent material, such as a suitable glass, to make the radome wedge (edge) 22 optically transparent. The optical transparency may be to allow light to pass through the radome wedge (edge) 22, for example laser light, such as laser encoded signals, as described further below. It will also be appreciated that the radome wedge (edge) 22 may have a different material in order to withstand the forces it receives at the very front of the missile 10, which may result in heating beyond that experienced by the radome body 20. The glass of the radome wedge (edge) 22 may be suitable for the heat build-up and other environmental characteristics that will be encountered at the very front of the missile 12.

A metal tip 24 may be located at the front of the radome wedge 22. The metal tip 24 may serve to protect the radome 16 against rain or erosion, for instance.

More detailed explanations are now provided regarding the materials of the radome body 20 and the radome wedge 22. The radome body 20 is made of a lossy optically nontransparent dielectric material. Certain ceramics are examples of suitable lossy optically nontransparent dielectric materials. The radome wedge 22, in contrast, is made of a lossless dielectric, which includes very low lossy dielectric material, where the imaginary part of the dielectric constant is very low. The material of the radome wedge 22 may also be optically transparent. Certain glasses are examples of suitable materials for the radome wedge 22.

As used herein a "lossless material" or "lossless dielectric material" is a material for which $$\frac{\sigma}{\omega\varepsilon} < \frac{1}{100},$$

where σ is the electrical conductivity of medium (material), ∈ is the permittivity of medium, and ω is radian frequency, which is 2πf, where f is the frequency. A "lossy material" of "lossy dielectric material" is a material for which $$\frac{1}{100} < \frac{\sigma}{\omega\varepsilon} < 100.$$

A "conductive material" is a material for which $$100 < \frac{\sigma}{\omega\varepsilon}.$$

For purposes of these definitions a representative frequency f of 3 GHz may be used. Radomes such as those described herein may be used for frequencies in the range of 3-200 GHz, although these values should not be taken as limiting.

The radome body 20 and the radome wedge (edge) 22 may be coupled together by any of a variety of suitable means or methods. To give one example, the radome wedge (edge) 22 may be adhesively coupled to the radome body 20 using a suitable adhesive. Brazing is another method/means by which the radome body 20 and the radome wedge (edge) 22 may be coupled together. As another alternative, the radome body 20 and the radome wedge (edge) 22 may be parts of a single unitary continuous piece, for example formed in a single piece by diffusion of the materials of the radome body 20 and the radome wedge 22, such as occurs under elevated temperature. There may be a region along the border between the radome body 20 and the radome wedge (edge) 22 in which materials used in both the body 20 and the wedge (edge) 22 are present. There may be a material gradient near (in a vicinity of) a boundary 30 between the body 20 and wedge (edge) 22, with a gradual material change in a boundary region 32 from that of the radome body 20 to that of the radome wedge (edge) 22.

A laser 40 is located aft of the main antenna 14. The laser 40 is used to send encoded signals to illuminate a target of the missile 10. The signals are sent from the laser 40 along one or more optical fibers 42 that extend from the laser 40 to the radome wedge (edge) 22. The optical fiber(s) 42 may extend along the inner surface of the radome 16, and may be located at least partially within the material of the radome 16. The optical fibers 42 may be grouped in optical fiber bundles. The laser 40 and the optical fiber(s) 42 together may be considered to function as a laser designator 44, an optical emitter that illuminates the intended target with an encoded laser signal. For example the encoding may be contained in an encoded pulse train. The length of pulses, the pauses between pulses, and/or the intensity of pulses, may constitute an identifier or code substantially unique to the missile 10, and different from encoding utilized by other munitions. The reflected laser light ("sparkle") from the intended target may be detected by a semi-active laser (SAL) seeker 46 that is located inside the radome wedge (edge) 22. The SAL seeker 46 may be or may include a bundle of optical fibers. Some of the optical fibers 42 may be used for transmitting signals from the seeker 46 to other components of the missile 10, such as a quad detector 48 or other suitable components aft of the main antenna 14, located in a fuselage 49 of the missile 10. The quad detector 48 may be used for detecting encoded pulse or other identifiers in incoming light signals, as described further below.

By detecting the encoding in the reflection of the encoded laser signals the fact that the missile 10 is targeting the illuminated target may be determinable by other missiles/munitions. Receipt by the seeker 46 of encoded signals having different encoding than the signals sent by the missile 10 indicates that another missile or other munition may be targeting the same target. This information may be useful in avoiding having multiple missiles/munitions targeting the same target.

Figure 2:
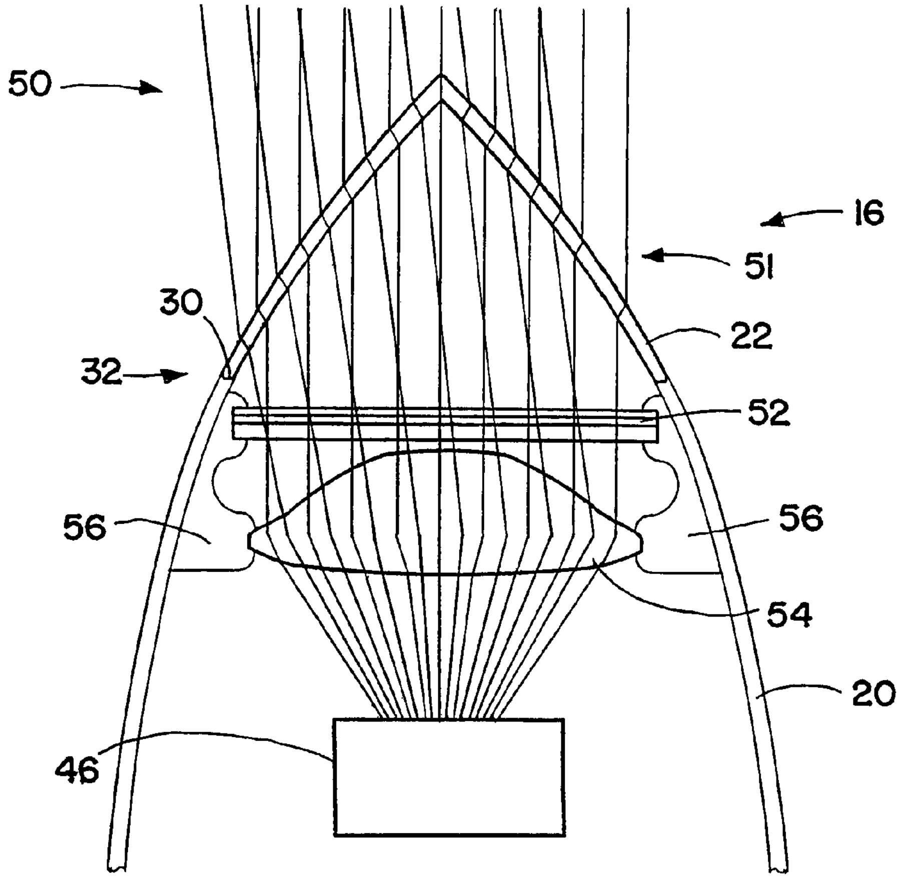
FIG. 2 is a cross-section view of part of the missile radar system of FIG. 1, showing further details near the tip of the missile.

FIG. 2 shows further details of the setup for the seeker 46. The SAL seeker 46 is within or behind the radome wedge (edge) 22, receiving incoming signals 50 that pass through the radome wedge (edge) 22. The incoming optical signals 50, as well as outgoing optical signals passing through the optically-transmissive radome wedge 22, travel along an optical path 51. Between the radome wedge (edge) 22 and the seeker 46 are a filter 52 and an SAL lens 54. The filer 52, which may be omitted, may aid in filtering laser light, in order to reduce reflections within the radome 16. The SAL lens 54 aids in focusing incoming light onto the seeker 46. More than one lens may be employed in focusing the incoming light.

The filter 52 and the SAL lens 54 may be mechanically coupled to the radome 16 using a nonmetallic structure 56. The nonmetallic structure 56 may be made of a suitable nonmetallic material, such as a suitable ceramic. Using a nonmetallic material for the structure 56 avoids interference in radar signals that would occur if a metallic structure was used.

Figure 3:
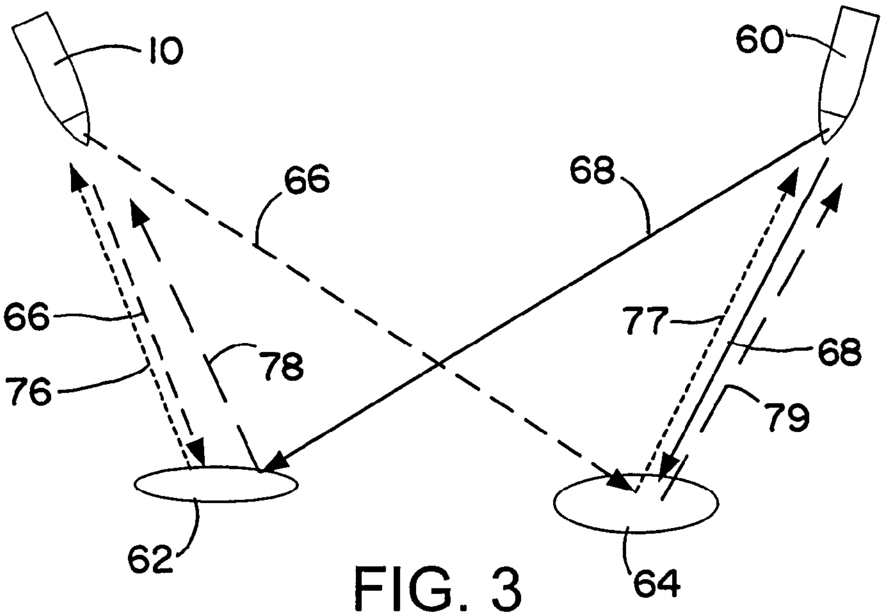
FIG. 3 is a schematic diagram illustrating employment of the missile radar system of FIG. 1 in a situation where two missiles are targeting separate targets.

FIG. 3 illustrates a situation where the missile 10 and a missile 60 are targeting a pair of targets 62 and 64. The missile 10 sends out an encoded laser (optical) signal 66, encoded with a first encoding scheme. The missile 60 sends out a different encoded laser (optical) signal 68, encoded with a second, different encoding scheme. The encoding may be accomplished through any of a wide variety of known methods, such as including high-amplitude pulses at a specified series of intervals. Both of the signals 66 and 68 illuminate both of the targets 62 and 64. The missiles 10 and 60 are targeting different targets, with the missile 10 targeting the first target 62, and the missile 60 targeting the second target 64. The first encoded signal 66 produces a reflected signal 76, reflecting off the first target 62. The first encoded signal 66 also produces a reflected signal 77 that is a reflection off of the second target. The second encoded signal 68 produces corresponding reflected signals 78 and 79, reflections off of the targets 62 and 64, respectively.

The seeker 46 (FIG. 1) of the first missile 10 is focused on the first target 62, which the first missile 10 is aiming at. The first missile 10 is able to receive both of the reflected signals 76 and 78 that reflect off of the first target 62. However, because of the encoding in the encoded signal 66, which is also present in the corresponding reflected signal 76, the first missile 10 is able to distinguish the reflected signal 76 from the reflected signal 78 (which is not encoded, at least not with the same encoding). The missile 10 is thus able to distinguish between the reflected signal 76 that is a reflection of the signal 66 that the missile 10 sent out, and the reflected signal 78. Similarly, the encoding of the signal 68 allows the missile 60 to be able to distinguish between the reflected signal 79, which shares the same encoding as the signal 68, and the reflected signal 77, which does not.

The encoding thus allows the missile 10 and 60 to distinguish between signals, and reject for navigation purposes all signals other than signals with the same encoding as the sent signal. Extraneous signals that are rejected may include encoded signals from other missiles (as in the illustrated embodiment), non-encoded signals from other munitions or targeting systems, or even spurious signals deliberately sent in an attempt to confuse targeting systems. The missiles 10 and 60 are able to focus only on the reflections of their own signals, which are the reflections of interest for targeting purposes.

In addition, the coding may be used to aid the missile in selecting a target, based on reaction of the coding scheme signal with the target. Different target surfaces will produce different interactions with the coded signals in producing a reflected signal. For example a burning vehicle will be expected to affect the signal (and its coding) differently than would a painted surface of an unburned vehicle. The missile 10 may be configured to detect and distinguish different types of reflections of the coded signal 10. This information may be used in prioritizing and/or selecting targets.

The use of coded signals as described above is not limited to missiles. It may be possible for the missile 10 to target other sorts of laser-guided munitions, such as laser-guided bombs, that are aimed at the same target that the missile 10 is targeting.

Figure 4:
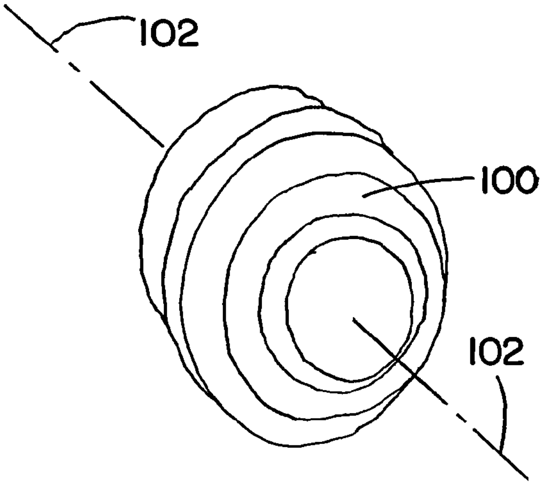
FIG. 4 is a diagram illustrating the free space signal strength of signals received by an antenna such as the main antenna of the missile radar system of FIG. 1, in the absence of a radome.

In addition to the advantages for allowing sending and receiving of optical signals, the radome 20 described above provides advantages in receiving radar signals, by avoiding radar signal degradation that occurred in prior art systems. FIG. 4 shows the free space pattern of signals received by a radar antenna such as main antenna 14 (FIG. 1). This is an ideal result, not taking into account the effects of a radome. The three-dimensional plot 100 in FIG. 4 is an indicator of the three-dimensional free space radiation pattern along the bore side of the main antenna 14. The bore side in this case represents the radiation pattern along an axis 102 perpendicular to the surface of the antenna 14. When the main antenna 14 is located in the missile 10 (FIG. 1), the axis 102 is supposed to be coincident with the axis of the missile 10. The three-dimensional radiation pattern 100 has its maximum value along the axis 102 that corresponds to the direction of travel of the reflected signal. This is to be expected, and allows a missile to be easily directed toward a target (or other aim point). The maximum value is the so-called "angle of arrival," and is an important parameter for the guidance of the missile 10. By directing the missile 10 toward the location of maximum signal strength, the missile is directed toward the target or other aim point.

Figure 5:
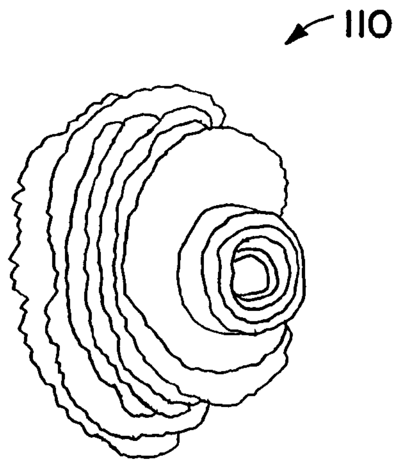
FIG. 5 is a diagram illustrating the free space signal strength of signals received by an antenna such as the main antenna of the missile radar system of FIG. 1, in the presence of a prior art radome having a lossy non transparent wedge (or edge).
Figure 6:
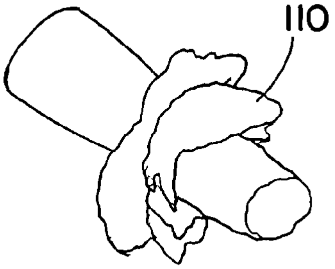
FIG. 6 is a diagram illustrating the signal strength in the presence of a prior art radome having a lossy non transparent wedge (or edge).
Figure 7:
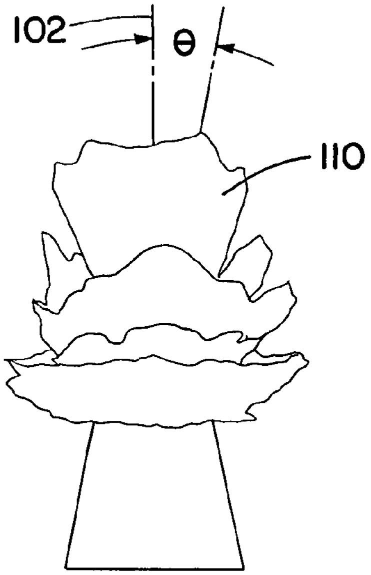
FIG. 7 is another diagram illustrating the signal strength in the presence of a prior art radome having a lossy non transparent wedge (or edge).
Figure 8:
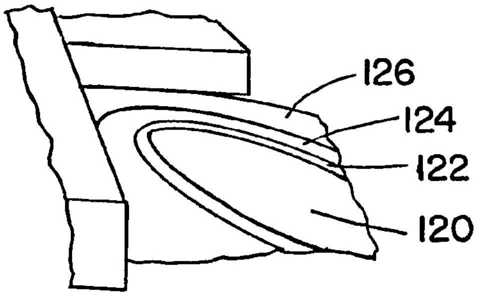
FIG. 8 is a plot illustrating radar strength in an example RF coverage area scanned by a radar system utilizing a prior art radome having a lossy non transparent wedge (or edge).

Unfortunately the signal strength does not have the ideal shape indicated in FIG. 4. FIGS. 5-7 show a three-dimensional radiation pattern 110 deformed, with an angle $\theta$ indicating a degraded angle of arrival, for a system including a prior art radome with a lossy wedge (edge) at its front. The presence of the prior art lossy-wedge radome degrades the signal, especially in the vicinity of the axis 102. As best seen in FIG. 7, the signal peak is no longer along the axis 102, but is offset from the axis 102 by an offset angle $\theta$, which may be for example between 5 and 8 degrees. This degradation of signal results in regions of low signal strength—an "RF (radio frequency) hole" in the response received through a prior art radome. An example is shown in FIG. 8 at the system level, where the response of a system is poor in a low signal central region 120 where the axis of the missile is pointed, and even poorer in a very low signal region 122 surrounding the central region 120. Another low signal region 124 is located on the outside of the very low signal region 122. A moderate signal strength region 126 begins only well away from the central region 120.

Figure 9:
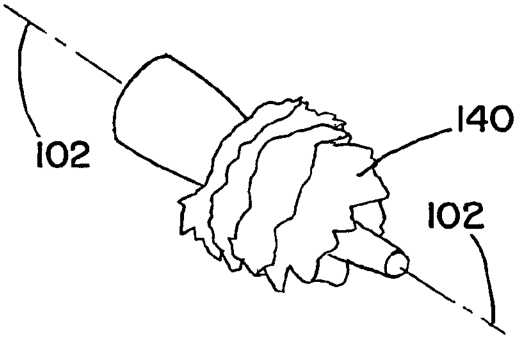
FIG. 9 is a diagram illustrating the signal strength in the presence of a radome according to an embodiment of the present invention indicating the improvement of the angle of arrival.
Figure 10:
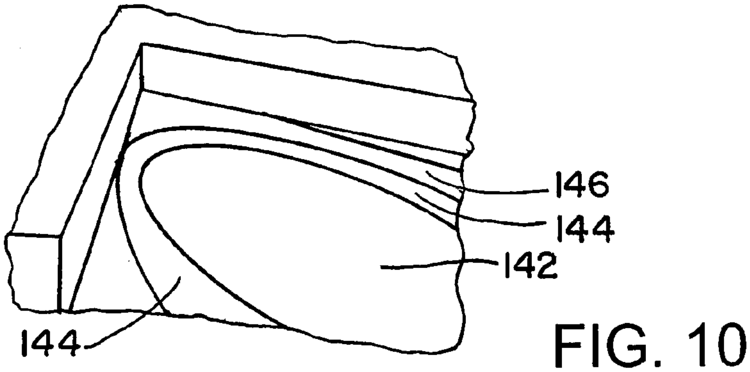
FIG. 10 is a plot illustrating radar strength in an example of RF coverage area (system level) scanned by a radar system utilizing a radome according to an embodiment of the present invention.

FIG. 9 shows a three-dimensional radiation pattern 140 for an embodiment of the present invention which avoids use of a lossy wedge, such as the missile 10 (FIG. 1). The signal strength is strongest along the axis 102, avoiding the offset angle θ shown in FIG. 7. FIG. 10 shows a map showing RF coverage at the system level, with signal strength modeled on the same scale as in FIG. 8. A wide high strength central region 142 takes the place of the low signal regions 120-124 of FIG. 8. The signal strength in this region 142 exceeds that of any of the regions 120-126. The high strength region 144 is surrounded by a moderate strength region 146. The good response shown in FIGS. 9 and 10 demonstrates that the radome 16 (FIG. 1) avoids the offset angle and RF hole problems, among other signal degradation problems.

From the foregoing it will be appreciated that many aspects of the present invention provide significant advantages over prior systems. Avoiding a lossy wedge (edge) prevents degradation of the signal strength of signals received by the missile's main antenna. Not only is a general degradation of signal strength prevented, but the problems of peak offset and low strength regions (RF holes) are avoided. In addition the angle of arrival is also corrected. The use of a substantially optically transparent radome tip allows employment of optical imaging through the radome. The employment of a seeker allows for designation of a specific target that the RF-guided missile should strike. The use of a seeker, in conjunction with a laser for illuminating the target, increases the precision of guidance toward a desired target. It also enables flexibility in targeting, and fast-reaction targeting. Finally, the use of encoded laser signals allows detection by the missile of situations where multiple munitions are aimed at the same target. Furthermore the use of encoded optical signals allows the missile to select and prioritize targets dynamically or based on priory information for certain targets.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A missile radar system comprising:

a main antenna; and a radome enclosing the main antenna;

wherein the radome includes a radome body and a radome wedge;

wherein the radome body has a wide end and a narrow end, with the main antenna at the wide end, and the radome wedge at the narrow end;

wherein the radome wedge and the radome body include different materials that are substantially transparent to radar signals emitted by the main antenna; and wherein the radome wedge and the radome body are formed as a single unitary piece of material.

2. The missile radar system of claim 1, wherein there is a material gradient in a boundary region around a boundary between the radome wedge and the radome body.

3. A missile radar system comprising:

a main antenna; and a radome enclosing the main antenna;

wherein the radome includes a radome body and a radome wedge;

wherein the radome body has a wide end and a narrow end, with the main antenna at the wide end, and the radome wedge at the narrow end;

wherein the radome wedge and the radome body include different materials that are substantially transparent to radar signals emitted by the main antenna;

wherein the radome body includes a lossy dielectric material; and wherein the radome wedge includes lossless material.

4. The missile radar system of claim 3, wherein the radome wedge and the radome body are separate pieces that are attached together.

5. The missile radar system of claim 3, wherein the radome wedge is a nonmetallic radome wedge.

6. The missile radar system of claim 3, wherein the radome wedge and the radome body are formed as a single unitary piece of material.

7. The missile radar system of claim 6, wherein there is a material gradient in a boundary region around a boundary between the radome wedge and the radome body.

8. A missile radar system comprising:

a main antenna; and a radome enclosing the main antenna;

wherein the radome includes a radome body and a radome wedge;

wherein the radome body has a wide end and a narrow end, with the main antenna at the wide end, and the radome wedge at the narrow end;

wherein the radome wedge and the radome body include different materials that are substantially transparent to radar signals emitted by the main antenna; and wherein the radome wedge is optically transparent.

9. The missile radar system of claim 8, further comprising:

an optical emitter that emits light through the radome wedge; and a seeker that receives reflections from the light emitted by the optical emitter.

10. The missile radar system of claim 9, wherein the optical emitter includes:

a laser; and one or more optical fibers that transport the light from the laser to within the radome wedge.

11. The missile radar system of claim 9, further comprising a lens between the seeker and the radome wedge.

12. The missile radar system of claim 11, further comprising a filter between the seeker and the radome wedge.

13. The missile radar system of claim 12, wherein at least one of the filter and the lens is coupled to the radome by a nonmetallic structure.

14. The missile radar system of claim 8, wherein the radome wedge and the radome body are formed as a single unitary piece of material.

15. The missile radar system of claim 14, wherein there is a material gradient in a boundary region around a boundary between the radome wedge and the radome body.

16. The missile radar system of claim 8, wherein the radome wedge and the radome body are separate pieces that are attached together.

17. The missile radar system of claim 8, wherein the radome wedge is a nonmetallic radome wedge.

18. A missile radar system comprising:

a main antenna;

a radome enclosing the main antenna; and one or more optical fibers that run from aft of the main antenna to within the radome wedge;

wherein the radome includes a radome body and a radome wedge;

wherein the radome body has a wide end and a narrow end, with the main antenna at the wide end, and the radome wedge at the narrow end; and wherein the radome wedge and the radome body include different materials that are substantially transparent to radar signals emitted by the main antenna.

19. The missile radar system of claim 18, wherein the one or more optical fibers run along an inner surface of the radome body.

20. The missile radar system of claim 18, wherein the one or more optical fibers are at least partially embedded in the radome body.

21. A missile optical system comprising:

a radome having an optically transmissive front radome wedge;

a seeker within the radome that sends and receives optical signals on an optical path that passes through the optically transmissive front radome wedge; and one or more lenses in the optical path, between the seeker and the optically transmissive front radome wedge.

22. A method of missile target guidance, the method comprising:

receiving a reflected signal from an intended target of a missile, wherein the reflected signal is received at a seeker of a missile, after passing through an optically-transparent radome wedge of the missile;

examining the reflected signal for the presence of signals not including signal encoding associated with signals sent by the missile; and if the reflected signal includes encoding not associated with signals sent by the missile, rejecting and not using for navigation purposes the signals not including encoding not associated with signals sent by the missile.

23. The method of claim 22, wherein the receiving the reflected signal includes receiving a reflected laser signal from a laser used to illuminate the intended target.

24. The method of claim 22, further comprising the missile illuminating the intended target with a laser signal encoded with the signal encoding associated with signals sent by the missile;

wherein the illuminating includes transmitting the laser signal through the optically-transparent radome wedge.

25. A method of improving performance of an antenna, the method comprising:

providing a radome with a lossless, optically transparent radome wedge and a lossy dielectric radome body; and placing the antenna within the radome.

* * * * *